June 9, 1959

F. A. BEHR 2,890,344

ANALYSIS OF MATERIALS BY X-RAYS

Filed Dec. 27, 1955

INVENTOR
FREDERICK A. BEHR

AGENT

2,890,344
ANALYSIS OF MATERIALS BY X-RAYS

Frederick A. Behr, Hatfield, Pa., assignor to North American Philips Company, Inc., New York, N.Y., a corporation of Delaware Application December 27, 1955, Serial No. 555,420

8 Claims. (Cl. 250—53)

My invention relates to a method of testing materials and in particular to a method of quantitatively analyzing a material and determining the thickness of thin films of material.

X-ray techniques have been developed for non-destructively testing materials such as making quantitative and qualitative analyses of materials and measuring the thickness of thin layers. These methods have the advantage that they afford a rapid method of analysis and control of compositions and thickness. Such methods, however, are limited to materials containing higher atomic number elements, i.e. elements in the periodic table having atomic numbers higher than that of neon and consequently are not operable on organic materials unless such materials contain one or more of those higher number elements.

It is a principal object of my invention to provide, in combination with existing X-ray techniques, a comprehensive method of testing materials.

It is another object of my invention to provide a non-destructive method of analyzing purely organic materials.

It is a still further object of my invention to provide a non-destructive method of determining the moisture content of inorganic materials.

It is a still further object of my invention to provide a non-destructive method of measuring the thickness of thin layers containing only low atomic number elements.

And yet another object of my invention is to provide a method of measuring thin layers consisting solely of organic materials.

These and further objects of my invention will appear as the specification progresses.

Briefly stated, my invention comprises the detection and measurement of X-radiation scattered by a sample of the material exposed to a heterogeneous beam of primary X-radiation. In carrying out the method according to my invention, the scattered radiation from the sample is separated into its different wave lengths and a particular wave length longer than a corresponding modified wave length in the primary beam of X-radiation is selected and its intensity measured in order to obtain an indication of the amount of an element in the specimen or the thickness of the specimen after comparison with a known composition of known thickness.

The invention will be described with reference to the accompanying drawing in which.

Figure 1:
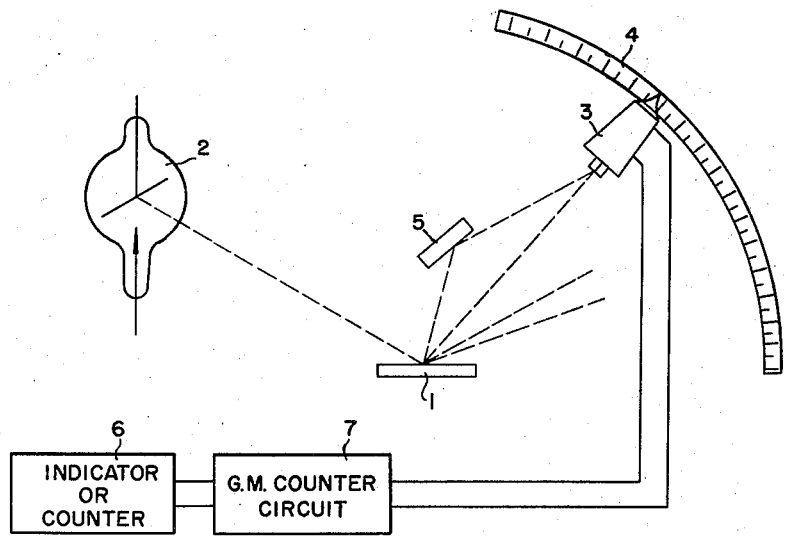
Fig. 1 shows an apparatus for carrying out the invention.

In Fig. 1, a specimen 1 of material to be analyzed is exposed to a heterogeneous beam of X-radiation generated by an X-ray tube 2. The specimen scatters the incident primary radiation and modifies a portion of the incident radiation by changing its wave length, the amount of radiation so modified by the specimen being determined by its elemental and quantitative constitution. A conventional detector of X-radiation 3, e.g. Geiger-Muller tube, proportional counter, scintillation counter, ionization chamber or the like, movably mounted on a scale 4 is positioned to detect radiation of a selected wave length separated from the remainder of the scattered X-radiation by a crystal monochromator 5, or a filter (not shown). Electrical pulses produced by the detector in response to incoming radiation are counted by appropriate electronic counting circuits 6 coupled to the detector and displayed on a suitable indicating device 7 such as a strip chart recorder or display panel.

Figure 2:
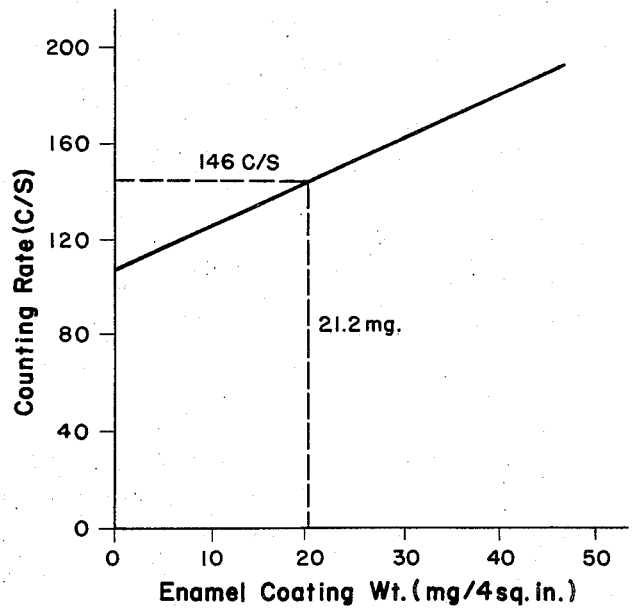
Fig. 2 shows a graph of coating thickness obtained by the method according to the invention.

Fig. 2 shows a graph obtained by exposing steel sheets coated with lacquer coatings of various thicknesses ranging up to a maximum of 10 mg. per square inch. The specimens were irradiated, on the lacquered side, by X-rays of heterogeneous energies from a tungsten target X-ray tube operated at 50 kv. peak potential and a tube current of 45 ma.

When so exposed, a portion of the incident radiation which is scattered by the coating is modified by the well-known Compton effect (cf. Clark, Applied X-rays, 4th Ed., pages 168–169), i.e. the spectra of the scattered rays show not only lines with the same wave length as those in the primary beam but also, on the long wave length side of these lines, other lines which indicate that in the process a distinct change has occurred. The ratio of the intensities of the modified and unmodified rays in the Compton effect, however, varies with the atomic number of the radiator element, i.e. it is greatest for the lower atomic number elements.

Thus, the intensity of the modified rays of the radiator element in the sample provide a convenient means of measuring the amount present by comparison with a sample of known constitution. Assuming the sample contains hydrogen, as the lacquer in the aforesaid illustration, the detector 3 is located to detect rays having a wave length of 1.5 A. separated out of the spectrum of scattered radiation by the crystal monochromator. The counter circuits and indicator count and indicate the number of pulses produced by the detector. If, as in Fig. 2, the number of counts per second are determined from measurements on standard samples and plotted on a graph, the amount of the element present in the sample can be established by reference to the graph. For example, the graph shown in Fig. 2 was prepared by measuring the intensities of rays having a wave length of 1.5 A. scattered by a steel sheet 4 sq. in. in area having enamel lacquer coatings of varying thicknesses. From the data thus obtained a graph was prepared with abscissae plotted as coating weight in milligrams per 4 sq. in. and ordinates as counts per second. A sample with a coating of unknown thickness was similarly exposed and the number of counts per second measured as 146 corresponding to a coating weight of 21.2 mg./e. sq. in.

While the method has been described in connection with lacquer coated steel sheets, it is applicable to the determination of any coated article, i.e. a base and a covering layer of different material. While the method can be employed with any material, the modification of the primary rays is most pronounced with the low atomic number elements and I prefer to carry out my method with materials containing an element in the first three periods of the periodic table. However, I wish it to be expressly understood that my invention is not limited to compositions containing only low atomic number elements.

Similarly, while the invention has been described in connection with coatings, it is also to be understood that it is applicable to quantitative determinations of components of materials. I therefore wish to have the appended claims construed as broadly as permissible in view of the prior art.

What I claim is:

1. A method of analyzing a material containing at least one element in the first three periods of the periodic table of elements comprising the steps, exposing a specimen of said material to a beam of primary X-radiation having at least one component of given wave length, measuring the intensity of a component of the primary X-radiation scattered by said element having a wave length different than said given wave length, and comparing the intensity of said scattered component with the intensity of a like component scattered in like manner by a material of known composition thereby to obtain an indication of the composition of the unknown specimen.

2. A method of analyzing a material for a specific constituent thereof containing at least one element in the first three periods of the periodic table of elements comprising the steps, exposing a specimen of said material to a beam of primary X-radiation having at least one component of given wave length, measuring the intensity of a component of the primary X-radiation scattered by said low atomic number element having a wave length different than said given wave length, and comparing the intensity of said scattered component with the intensity of a like component scattered in like manner by a material of known composition thereby to obtain an indication of the composition of the unknown specimen.

3. A method of analyzing a material containing at least one element in the first three periods of the periodic table of elements comprising the steps, exposing a specimen of said material to a beam of primary X-radiation having at least one component of given wave length, separating the components of the primary X-radiation scattered by said specimen, measuring the intensity of one of said latter components having a wave length different than said given wave length, and comparing the intensity of said latter component with the intensity of a like component obtained in like manner from a known composition thereby to obtain an indication of the composition of the unknown specimen.

4. A method of measuring the thickness of thin layers of organic material comprising the steps, exposing a specimen of said layer to a beam of primary X-radiation having at least one component of given wave length, measuring the intensity of a component of the primary X-radiation scattered by said layer and having a wave length different than said given wave length, and comparing the intensity of said scattered component with the intensity of a like component obtained in like manner from a layer containing a low atomic number element of known thickness to thereby determine the thickness of said first mentioned layer.

5. A method of measuring the thickness of a thin layer containing at least one element in the first three periods of the periodic table of elements on a base of chemically disparate material comprising the steps, exposing a portion of said layer to a beam of primary X-radiation having at least one component of given wave length, measuring the intensity of a component of the primary X-radiation scattered by said layer having a wave length different than said given wave length, and comparing the intensity of said scattered component with the intensity of a like component obtained in like manner from a layer of the same composition and of known thickness to thereby determine the thickness of said unknown layer.

6. A method of quantitatively analyzing a material containing at least one element in the first three periods of the periodic table of elements comprising the steps, exposing a specimen of said material to a beam of primary X-radiation havng at least one component of given wave length, measuring the intensity of a component of the primary X-radiation scattered by said element having a wave length different than said given wave length, and comparing the intensity of said scattered component with the intensity of a like component obtained in like manner from a specimen containing a known quantity of said element known to thereby obtain an indication of the amount of said element in said unknown specimen.

7. A method of measuring the thickness of thin layers containing at least one element in the first three periods of the periodic table of elements comprising the steps, exposing a specimen of said layer to a beam of primary X-radiation having at least one component of given wave length, measuring the intensity of a component of the primary X-radiation scattered by said layer having a wave length different than said given wave length, and comparing the intensity of said component of the scattered radiation with the intensity of a like component obtained in like manner by a layer of the same composition and known thickness to thereby determine the thickness of said first mentioned layer.

8. A method of determining the moisture content of inorganic materials comprising the steps, exposing a specimen of said material to a beam of primary X-radiation having at least one component of given wave length, measuring the intensity of a component of the primary X-radiation scattered by said specimen having a wave length different than said given wave length, and comparing the intensity of said scattered component with the intensity of a like component obtained in like manner from a specimen having a known moisture content to thereby obtain an indication of the moisture content of said unknown specimen.

References Cited in the file of this patent

UNITED STATES PATENTS

| 2,428,796 | Friedman | Oct. 14, 1947 |
| 2,449,066 | Friedman | Sept. 14, 1948 |
| 2,521,772 | Beeghly | Sept. 12, 1950 |
| 2,642,537 | Carrol et al. | June 16, 1953 |

OTHER REFERENCES

Clark: Applied X-rays, 4th Ed., pages 168–169 (1955).